US012108121B2

(12) United States Patent
Silverstein

(10) Patent No.: US 12,108,121 B2
(45) Date of Patent: Oct. 1, 2024

(54) METHODS FOR REPRODUCING MUSIC TO MIMIC LIVE PERFORMANCE

(71) Applicant: Brian M. Silverstein, San Carlos, CA (US)

(72) Inventor: Brian M. Silverstein, San Carlos, CA (US)

(73) Assignee: Brian M. Silverstein, San Carlos, CA (US)

( * ) Notice: Subject to any disclaimer, the term of this patent is extended or adjusted under 35 U.S.C. 154(b) by 206 days.

(21) Appl. No.: 17/828,485

(22) Filed: May 31, 2022

(65) Prior Publication Data

US 2022/0385991 A1 Dec. 1, 2022

Related U.S. Application Data

(60) Provisional application No. 63/195,577, filed on Jun. 1, 2021.

(51) Int. Cl.
*H04N 21/81* (2011.01)

(52) U.S. Cl.
CPC ... *H04N 21/8113* (2013.01); *G10H 2210/295* (2013.01)

(58) Field of Classification Search
None
See application file for complete search history.

(56) References Cited

U.S. PATENT DOCUMENTS

| | | | |
|---|---|---|---|
| 8,675,130 B2* | 3/2014 | Fincham | H04R 3/00 381/103 |
| 2013/0031220 A1* | 1/2013 | Moncavage | H04N 21/8113 709/219 |

\* cited by examiner

*Primary Examiner* — Hemant S Patel
(74) *Attorney, Agent, or Firm* — POLSINELLI LLP

(57) ABSTRACT

Disclosed are methods, systems, and non-transitory computer-readable storage media for reproducing music to mimic a live performance. The present technology includes means for receiving input corresponding to a plurality of component audio files associated with an original audio file; determining audio profiles of the plurality of component audio files and frequency profiles of a plurality of audio generators; determining a routing scheme for the plurality of component audio files and the plurality of audio generators, wherein the routing scheme is based on the audio profiles and the frequency profiles; and generating an output based on the routing scheme.

117 Claims, 7 Drawing Sheets

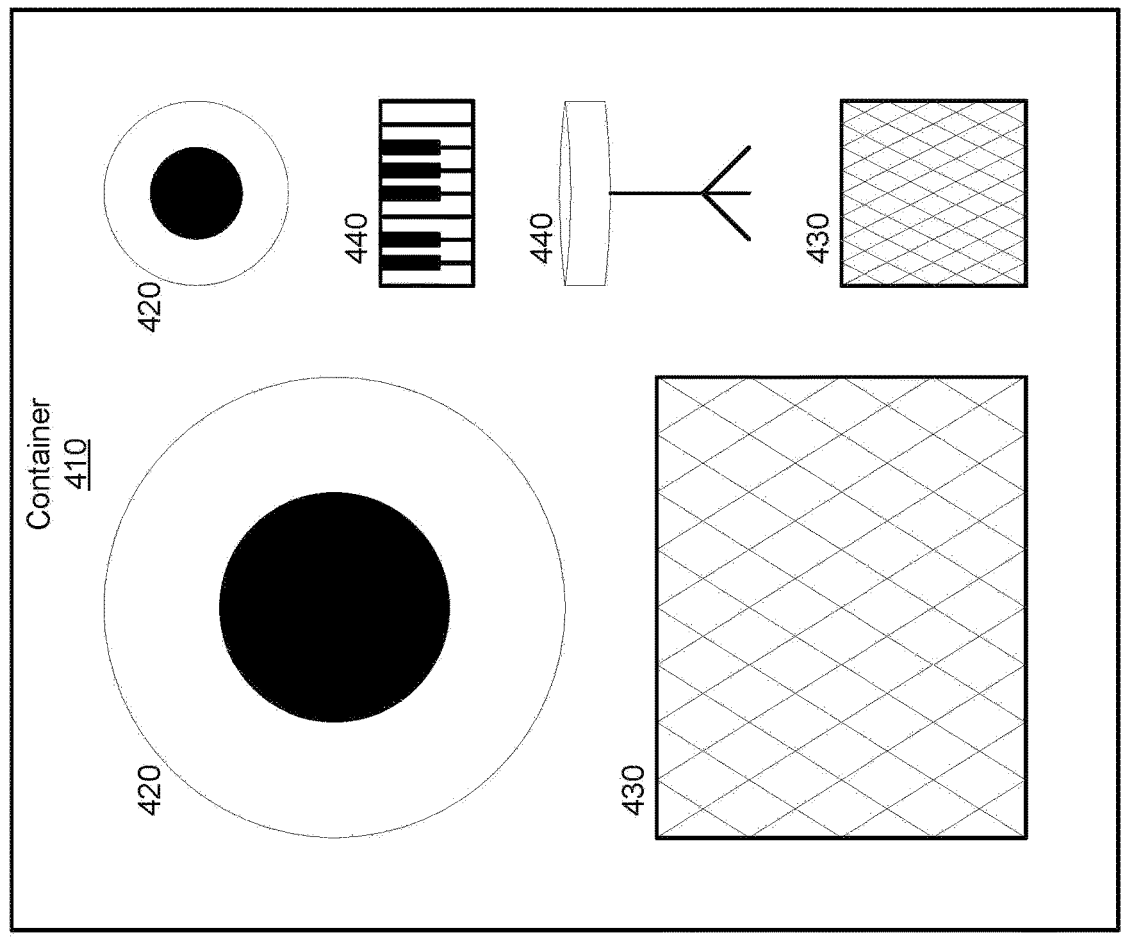
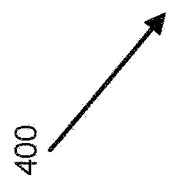
FIG. 4

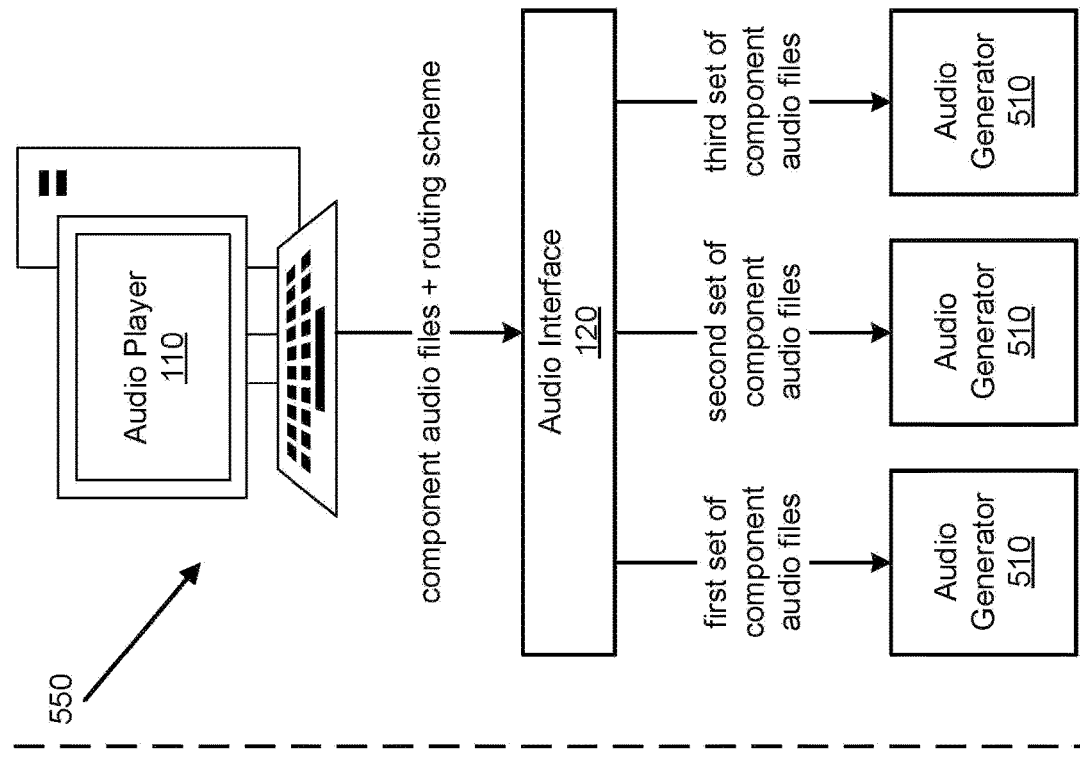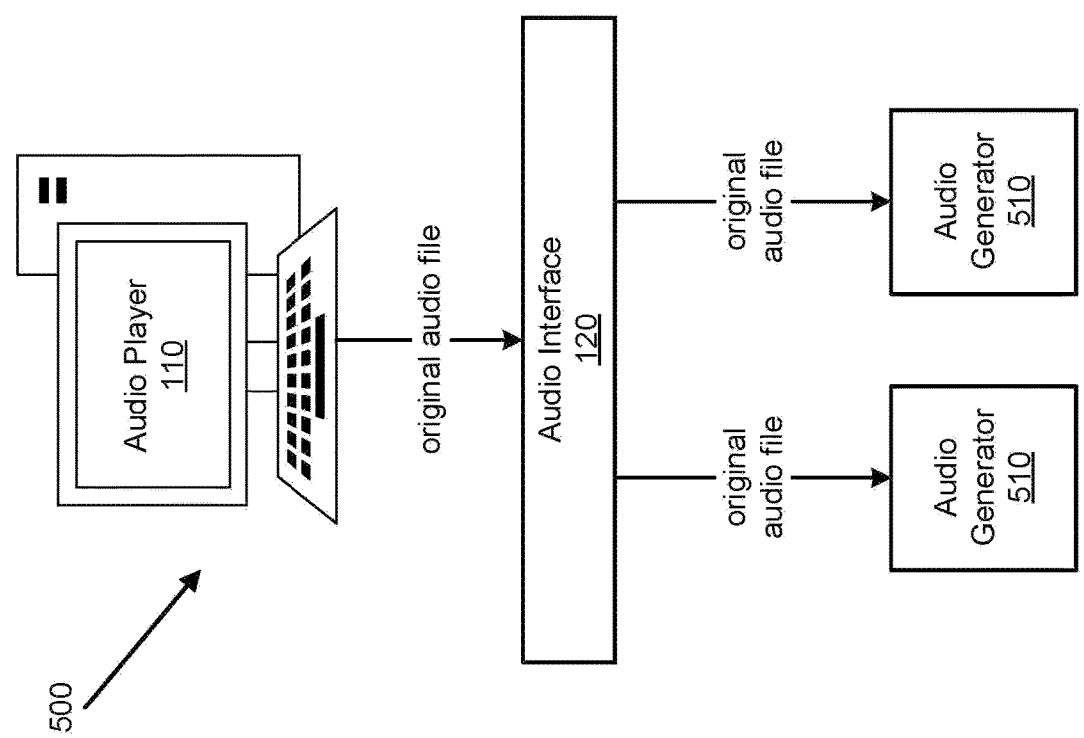
FIG. 5

600

Receiving input corresponding to a plurality of component audio files associated with an original audio file
610

Determining audio profiles of the plurality of component audio files and frequency profiles of a plurality of audio generators
620

Determining a routing scheme for the plurality of component audio files and the plurality of audio generators, wherein the routing scheme is based on the audio profiles and the frequency profiles
630

Generating an output based on the routing scheme
640

FIG. 6

METHODS FOR REPRODUCING MUSIC TO MIMIC LIVE PERFORMANCE

CROSS-REFERENCE TO RELATED APPLICATIONS

The present patent application claims the priority benefit of U.S. provisional patent application 63/195,577 file Jun. 1, 2021, the disclosure of which is incorporated herein by reference.

DESCRIPTION OF THE RELATED TECHNOLOGY

Disclosed are methods, systems, and non-transitory computer-readable media for reproducing music to mimic a live performance.

BACKGROUND

People love the sound of a live band. However, opportunities to see one's favorite musician(s) live are severely limited by touring schedules, location, and other factors. While studio recordings offer an opportunity for fans to listen to artists' music at any time and in a greater variety of locations, these recordings rarely capture the experience of listening to live music. Capturing a live sound in playback from a studio recording would fill a crucial niche in customer listening experiences.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 4 illustrates an example audio system, in accordance with some embodiments;

FIG. 5 illustrates a comparison between example audio systems, one using technology known in the art and one using the present technology, in accordance with some embodiments;

FIG. 6 illustrates a flowchart of an example method for routing audio files through an audio system, in accordance with some embodiments.

DETAILED DESCRIPTION

Figure 1:
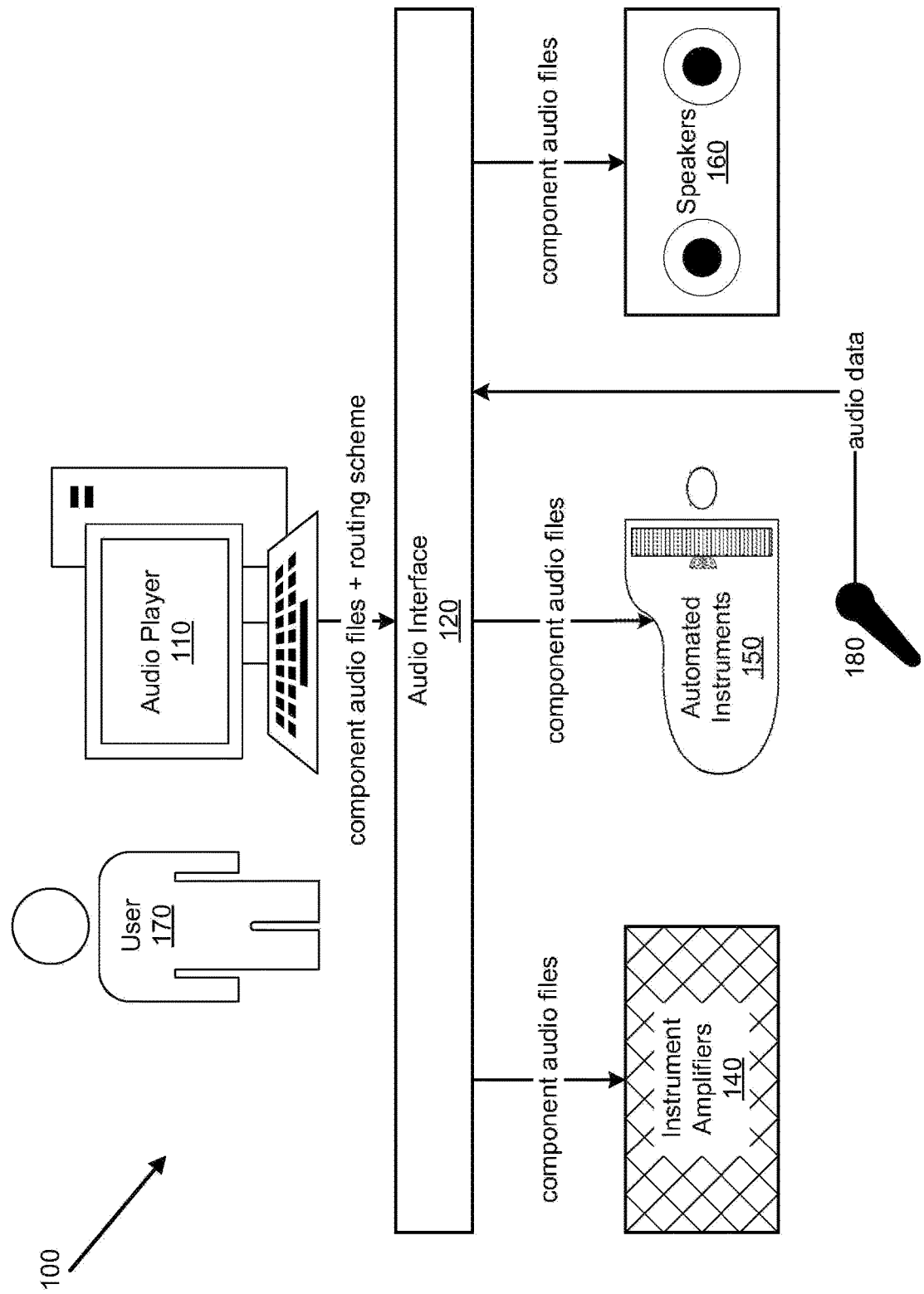
FIG. 1 illustrates an example system for reproducing music to mimic a live performance, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described, which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Description of Example Embodiments

Present-day audio systems offer a fairly straightforward one-size-fits-all solution. Speakers are often designed with flat frequency profiles to offer versatility for different kinds of music, movies, audiobooks, or for listening to other aural media. While the versatility of such audio systems provides an advantage, certain aspects of sound can be lost when played through generic speakers.

Consider the sound of a rock band. At a live performance, specialized microphones for the vocals and various drums will be utilized. Further, guitars and basses are played through amplifiers, which act as specialized speakers to enhance the sound of these electric instruments. Different amplifiers can offer very different sounds for the same instruments, i.e. a tube amplifier will usually provide a warmer sound than a solid state amplifier.

In audio systems that use a system of non-specialized speakers, the nuances of live music or other live performances, which have evolved to have certain characteristics distinct from studio recordings played through non-specialized speakers, can be lost. For live music aficionados and general audiences, this can result in a lesser listening experience.

One way to ameliorate this problem involves matching audio files with audio generators, such as specialized speakers, which highlight the character of certain audio files in desirable ways. Imagine a studio recording of a rock band, consisting of a guitar part, a bass part, a drum part, and a vocal part. Currently, all of these separate instrument and vocal tracks are not treated as separate parts, even though each require different audio generators to maximize the listening experience. In a generic speaker system, all parts would be routed through the same speakers, which generally have flat frequency profiles. While flat frequency profiles offer great versatility to modern speaker systems, they do not capture the live sound of an instrument the way that, for example, a guitar amplifier can capture the sound of an electric guitar.

A frequency profile for an audio generator is a spectrum of frequencies, which are generated in response to a signal. A flat frequency profile indicates a spectrum that does not privilege or amplify any frequencies over others. Most modern speakers possess approximately flat frequency profiles. On the other hand, audio generators like electric guitar amplifiers do not possess flat frequency profiles. Their unique frequency profiles enhance the sound of the input signal in certain ways and give rise to the specific tone and character of live electric guitar.

Matching the frequency profile of an audio generator with the audio profile of an audio file (i.e. the aural character of an audio file, explained in detail below) can offer a better listening experience. The sound of an electric guitar signal through a speaker is not the same as the sound of an electric guitar signal through a guitar amplifier. Thus, routing of audio files or signals through curated audio generators can create a sound better approximating a live performance.

Even when studio recordings are played through appropriate audio generators, there are other aspects of the recording that differ from the live experience. The differences between the recording and live environments can affect all elements of music: pitch, timbre, texture, volume, duration, and form. An example of these differences includes the studio output vs. the live experience of the Grateful Dead, whose studio recordings often feature straightforward recordings of songs and whose live performances are renowned for extended "jams" that may vary widely from their studio counterparts.

While a frequency profile captures pitch, timbre, texture, and volume of an audio file, the related term temporal profile captures duration and form. A temporal profile is a form of time series data, and captures the rhythm or timing of an audio file, including the tempo, length of the recording, rhythmic feel (i.e. swung vs. straight eighth notes, loose vs. strict beat), and other temporal factors. All aspects of music are covered, including frequency profiles and temporal profiles, with the general term audio profile for a given audio file.

Audio profiles of studio recordings can be altered to give them the feel of a live performance. In tandem with the use of appropriate audio generators, these changes to studio recordings can capture the live listening experience in playback. The present technology discloses means for reproducing music to mimic a live performance, both by matching audio files to audio generators and by altering audio files to better match live music-making.

FIG. 1 illustrates an example system 100 for reproducing music to mimic a live performance. Audio player 110 can send component audio files and a routing scheme to audio interface 120, which can route the component audio files to appropriate audio generators.

Audio player 110 can be any computing device, such as a personal computer, laptop, tablet, mobile phone, embedded computer such as a Raspberry Pi, or other computing device capable of connecting to audio interface 120. Audio player 110 can be a software application running on a computing device. Audio player 110 can receive audio files and send audio files. Audio player 110 can be a plurality of devices, such as an array of temporally synchronized CD players. Audio player 110 can be operated by user 170, via automation, or by other means.

Audio interface 120 can be any audio interface or connector that can receive input from audio player 110 and send audio output to various audio generators, such as instrument amplifiers 140, automated instruments 150, or speakers 160. Audio interface 120 can receive input from microphones (dynamic, condenser, or ribbon) such as microphone 180, instruments, MIDI controllers, or other audio sources. Audio interface 120 can have inputs for XLR cables, one-quarter inch cables, USB cables, or other audio cable designs. Audio interface 120 can provide phantom power to condenser microphones. Audio interface 120 can adjust signal gain of input audio signals. Audio interface 120 can send audio signals to audio player 110 during recording sessions. Audio interface 120 can handle a variety of audio file formats, including WAV files, MIDI files, or files that can be processed by automated instruments. Audio interface 120 can be the same device as audio player 110, or can be a separate device. Audio interface 120 can handle these various audio file formats compiled into one larger file, known as a SilverVibes file. Further explanation of the SilverVibes file format can be found below.

Instrument amplifiers 140 can be any audio amplifier, such as those used for electric guitars or basses in rock, jazz, or other music genres. Instrument amplifiers 140 can include a speaker, amplifier, enclosure, and, in some cases, effects such as reverberation and equalization (EQ). Instrument amplifiers 140 can be tube amplifiers, solid state amplifiers, class A amplifiers, class AB amplifiers, class D amplifiers, digital signal processing (DSP) and feedback amplifiers, acoustic bass amplifiers, acoustic guitar amplifiers, electronic drum amplifiers, or any other type of audio amplifier. Instrument amplifiers 140 can have various special enclosures; for example, instrument amplifiers 140 can be sealed, ported, or have open baffles.

Before reaching instrument amplifiers 140, the component audio files can pass through reamping boxes, which can be any hardware or software designed to take an audio signal and prepare it for amplification. The audio signal can be, for example, a direct input (DI) signal recorded by an electric guitarist via a DI box. The DI signal can be fed through reamping boxes, which can be reverse DI boxes. Feeding the DI signal through reamping boxes modifies the audio signal such that the impedance is appropriate for amplification. DI signals are often recorded in tandem with electronically amplified signals in the studio. Recording DI signals allows producers or other sound engineers to reamplify the guitar part using a new amplifier, which can give the same notes different timbres, colors, or flavors; in short, playing the recorded DI signal through new amplifiers will give the audio output a different audio profile than playing the recorded DI signal through its original amplifier.

Automated instruments 150 can be any musical instrument that is configured to perform music without being played manually. For example, automated instrument 150 can be a player piano such that a pneumatic or electro-mechanical mechanism operates the piano action in response to an input, such as music recorded on perforated paper, metallic rolls, or via the MIDI file format. Automated instruments 150 can be acoustic instruments, electric analog instruments, digital instruments, or other types of instruments. Automated instruments 150 can be musical instruments played by robotic apparatus or via other means. For example, automated instruments 150 can include a saxophone played by a robot, such as Waseda Saxophonist Robot No. 2, or a robotic apparatus attached to a snare drum that can hit the snare drum with specified hardware, volume, attack, or other characteristics. Component audio files processed by automatic instruments 150 can include files that instruct a robotic apparatus to make certain mechanical motions to cause an instrument to generate specific sounds, perforated paper processed by a player piano, sheet music that can be read by a robot with visual and motor processing capabilities, WAV files that can be converted into mechanical motions to generate similar sounds, or other types of files.

Speakers 160 can be any device that converts an electrical audio signal into a sound. For example, speakers 160 can be loudspeakers, studio monitors, stage monitors, line array speakers, PA speakers, horns, subwoofers, horn subwoofers, waveguides, or other kinds of speakers. Speakers 160 can be of various sizes, various placements in a spatial environment, and have various numbers of drivers. Speakers 160 can be passive or active speakers. Speakers 160 can include an audio signal amplifier.

A single speaker 160 can include multiple subspeakers, such as a tweeter and subwoofer. The tweeter/subwoofer combination can receive an audio signal that is split by a crossover such that the tweeter receives a portion of the audio signal and the subwoofer receives another portion. A crossover is a set of filters designed to split an audio signal into two or more separate bands. For example, a crossover can consist of a hi-pass filter that sends mid-range and hi-range frequencies to the tweeter and a low-pass filter that sends low-range frequencies to the subwoofer. Crossovers can be passive, and handle the full range of frequencies that are output by an amplifier. Crossovers can be active as well; active crossovers split the signal before amplification and route each portion of the audio signal through its own amplifier before reaching the subspeaker that is a part of speaker 160. Crossovers can be used for both routing and sound optimization, as frequencies can be matched with the appropriate subspeaker to create the best possible sound.

Together, instrument amplifiers 140, automated instruments 150, and speakers 160 comprise audio generators. An audio generator is any object capable of generating an audio signal. Common examples include musical instruments (strings, brass, woodwinds, percussion), instrument amplifiers, and speakers, but these examples are not exhaustive. Each audio generator has a frequency profile, a distribution of frequencies that define the character of an audio generator. For example, a middle C played on a piano sounds different than a middle C played on a violin. This is due, in part, to the different frequency profiles of the two instruments. Frequency profiles include the notion of overtone series (or harmonic series), which are often used to compare the timbres of instruments. The overtone series describes which frequencies sound over a base frequency, and at what volume. In other example, a middle C played on a keyboard connected to a bass amplifier will sound different than a middle C played on the same keyboard connected to a guitar amplifier. This is due, in part, to the different frequency profiles of the two amplifiers; the bass amplifier will highlight the lower tones in the overtone series of the middle C, while the guitar amplifier will highlight more of the mid- and high-range tones. Some audio generators, such as a set of bongo drums, can have multiple frequency profiles.

Microphone 180 can be any device capable of picking up audio signals, such as a dynamic microphone, ribbon microphone, condenser microphone, or a microphone embedded in a device, such as a mobile phone microphone or laptop microphone. Microphone 180 can be used to record audio to audio player 110 via audio interface 120. Microphone 180 can be used to monitor and capture data regarding sound and audio coming from audio generators, such as instrument amplifiers 140, automated instruments 150, and speakers 160, and feed that data to audio interface 120 and to audio player 110.

Data captured by a microphone 180 can be used by audio player 110 to alter the audio profiles of the component audio files in real-time, or statically as part of a sound check. For example, audio player 110 could play a portion of a song through the audio generators and use data from microphone 180 to learn how that song sounds given the current mix, routing scheme, spatial arrangement of the audio generators, spatial environment in which the audio generators reside, or given other factors. Based on this data, user 170 can modify the audio profiles of the component audio files, change the routing scheme, rearrange or reconfigure the audio generators and their respective settings, or otherwise modify the setup. These modifications can also be performed by an automated system using machine learning or artificial intelligence, which may continually refine and adjust audio parameters in accordance with an evolving learning model. For example, a machine learning model can detect differences between a desired sound of the component audio files run through the audio generators in this environment and the actual sound as recorded by microphone 180, and subsequently alter aspects of the setup to better achieve the desired sound. Multiple microphones 180 can be used to capture sound and audio associated with different audio sources. Real-time, dynamic changes that can affect how the audio generators sound in a spatial environment include shifting crowd density, whether something is in front of an audio generator, or other factors. Similar factors can be considered and simulated by audio player 110 in altering the frequency profiles of the audio generators.

Figure 2:
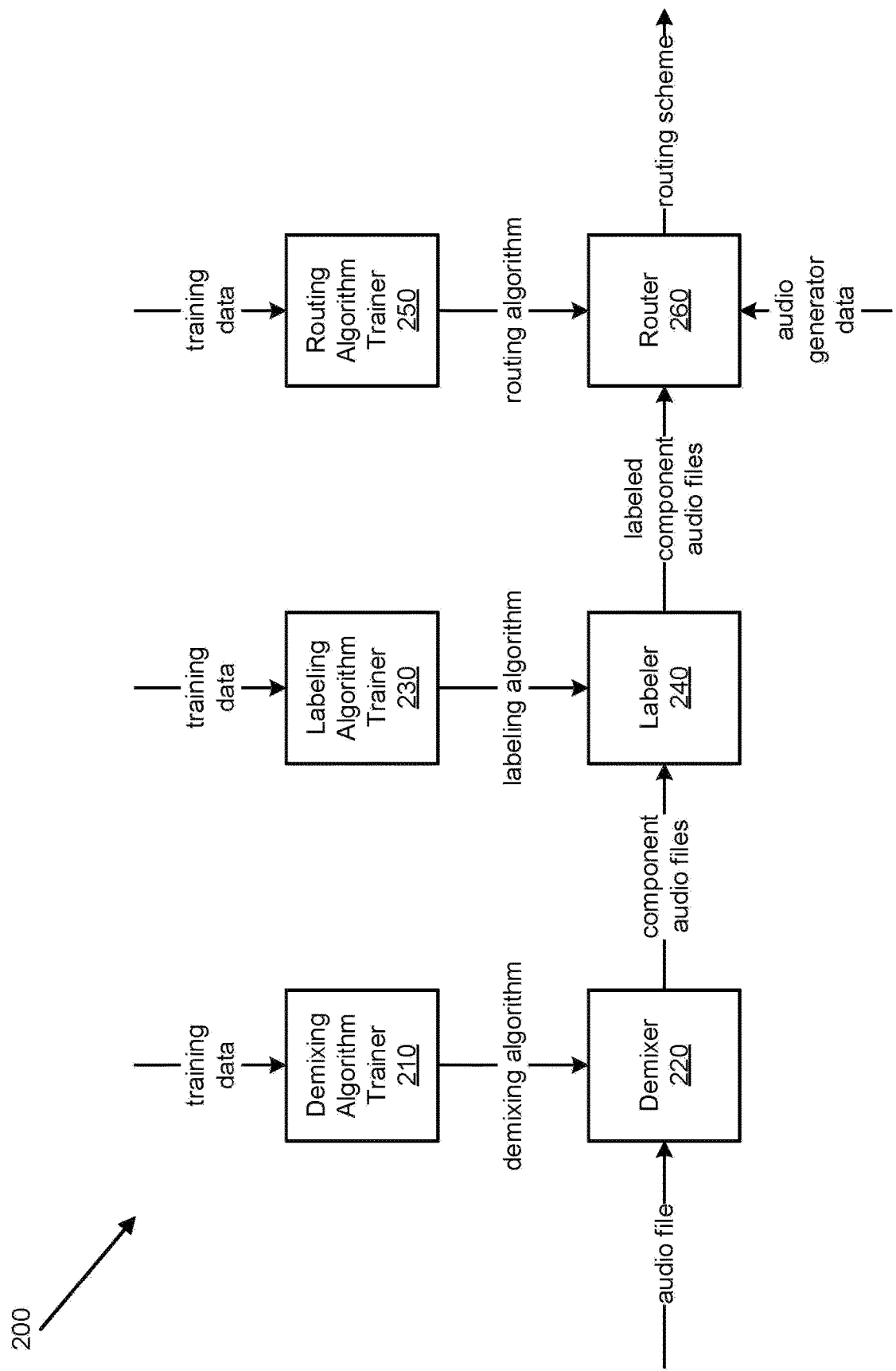
FIG. 2 illustrates an example system for determining a routing scheme, in accordance with some embodiments.

Audio player 110 can receive an input corresponding to the component audio files, which are associated with an original audio file. For example, the component audio files can be individual instrument tracks that comprise a studio recording, which in this example is the original audio file. Audio player 110 can extract the component audio files from the original audio file or receive the component audio files already extracted. The component audio files can be WAV files, MP3 files, M4A files, FLAC files, AAC files, OGG files, MIDI files, files that can be processed by automated instruments 150, or any other type of file capable of generating an audio signal when processed by an audio generator. The audio files can also be audiovisual files, such as MPEG, 1V11³4, MOV, WMV, or other file types, from which the audio is extracted. The audio files can be files that are fully downloaded, or files that are streamed from a streaming service such as Spotify or YouTube. The audio files can be livestreamed as well, such as through Zoom or Facebook Live. The audio files can also be other file types from which the audio is extracted. Audio player 110 can extract the component audio files using a machine learning algorithm, neural network, or via other automated means. FIG. 2 includes an in-depth discussion of some of these embodiments.

The various component audio files associated with the original audio file, metadata relating to the component audio files, and modifications to the component audio files can be packaged into a single file known as a SilverVibes file. A SilverVibes file contains both audio data and time series data, together encompassing audio profiles of each of the component audio files. SilverVibes files can constitute an open-source format. The audio data can include pulse-code modulation (PCM) or pulse-density modulation (PDM) audio encoded in various audio file types. These two methods represent the primary traditional means of audio digital sampling. Illustrative examples of file types using these methods include WAV files, AIFF files, and others. SilverVibes files can also contain other types of audio files, such as MIDI files. The time series data represents important temporal characteristics of the recording, such as whether a drummer is playing ahead of, on, or behind the beat. Both the audio data and time series data can be modified during execution by metadata included with the component audio file, or beforehand into the component audio files themselves. For example, metadata instructions could involve playing a WAV guitar track in the style of a certain guitarist, which can change the timbre, effects, rhythmic placement, or other elements of music or sound in the audio file. In another example, a MIDI file can be altered to apply accents in certain spots.

Audio player 110 can determine audio profiles of the plurality of the component audio files and frequency profiles of the audio generators (amplifiers 150, automated instruments 150, and speakers 160). An audio profile of an audio file can contain information about the frequencies corresponding to the audio file, including the amplitude and distribution of frequencies. A frequency profile of sound and audio associated with an audio generator can contain information about which frequencies the audio generator can generate, as well as information about amplitude and distribution of frequencies. Frequency profiles of audio generators can be tested by, for example, routing white noise or other predetermined calibration test signals through the audio generators and measuring which frequencies are present and at what amplitudes. Audio player 110 may also generate spectrograms or other visual representations corresponding to the frequency profile of a set of sound or audio associated with an audio generator.

Audio player 110 can determine a routing scheme for the component audio files and the audio generators. A routing scheme is a correspondence between the component audio files and the audio generators that determines which audio generators will generate audio signals for which component audio files. For example, a DI electric guitar track can be routed to instrument amplifiers 140, a piano track can be routed to automated instruments 150, and a vocal track can be routed to speakers 160. The routing scheme can be based on the audio profiles of the component audio files and of the audio generators or on other factors. By creating a routing scheme that takes into account the frequency profiles of the audio generators and the audio profiles of the component audio files, the sound coming out of the audio generators will better approximate whatever sound the routing scheme is trying to create, such as the sound of a live band. The routing scheme can be determined via an automated process, manually by user 170, or via other means. FIG. 2 includes an in-depth discussion of some embodiments of an automated routing scheme.

Audio player 110 can generate an output based on the determined routing scheme, which may include, for example, processing and sending the component audio files and the determined routing scheme to audio interface 120, which may further process and play the component audio files in accordance with instructions corresponding to the determined routing scheme. The routing scheme can be executed automatically through audio interface 120 or via approval or instructions received a GUI of audio player 110, or through other means. In some implementations, the user may further modify the component audio files or routing scheme prior to final routing and/or play.

User 170 can be presented with the audio experience within a virtual reality or augmented reality system operating in conjunction with audio player 110 to supplement the auditory experience with visual experience. Specialized headsets used to present the virtual or augmented environment may include audio generators, or may provide sound transparency as to other audio generators in the surrounding environment. Such headsets may be present visual graphics or effects that are coordinated with the audio for a combination audio-visual experience. For example, if the original audio file associated with the component audio files is a studio recording of a song performed by a certain band, the virtual reality or augmented reality system can generate graphics related to the band, such as a simulation of the band performing the song. The virtual reality or augmented reality system can generate other graphics as well, including visualizations based on the audio profile of the original audio file, spectrogram, an audiovisual file from which the audio files were extracted, or any graphics designated by or for the user. The virtual reality or augmented reality system can also utilize metadata associated with the recording to coordinate the presentation of the visual display with the auditory experience. For example, an augmented reality system can display a series of graphics of album covers, artist(s), and other visuals, etc., where the transitions and/or other visual effects may be synchronized to the audio. In another example, if an augmented reality headset or the user line-of-sight is aimed towards a certain portion of the virtual environment (e.g., player piano), a text overlay displaying information about the piano player on the recording can appear. The virtual reality or augmented reality system can interact with QR codes on audio generators or other aspects of audio system 100. Information regarding the user attention may be detected based on the direction or focus point of the user headset or line-of-sight within the virtual or augmented environment, which may be used to modify the presentation of subsequent graphics and associated audio (e.g., spatial 3-dimensional audio effects) in real-time.

Audio player 110 can generate an output based on the routing scheme for instrument amplifiers 140, automated instruments 150, and speakers 160, and this output can then be implemented in a system involving different audio generators. For example, the output can be ported in accordance with the determined routing scheme to a surround sound system with different audio generators possessing different audio capabilities and frequency profiles. The routing scheme can be modified by a routing scheme modifier contained within audio player 110, audio interface 120, or another device. These modifications can be automated, manual, or a combination of both. For example, consider a routing scheme originally routing a full orchestra to 2 stereo speakers, but subsequently being connected to a surround sound system. The routing scheme can re-route the various component audio files (violin, viola, trumpet, trombone, clarinet, flute, timpani, etc.) to the new surround system based on the audio profiles of the component audio files and of the surround sound system. The routing scheme can dynamically and in real time be modified to account for different instruments in the mix of component audio files, functionality of audio generators, or other factors. The resulting audio experience may therefore be not only a combination of the different audio profiles being routed to the audio generators, but the audio player 110 may further dynamically adjust the audio files or routing in real-time based on detected audio and sound from the audio generators, as well as any acoustic properties of the environment where the audio generators are located.

The component audio files can include audio files that are not associated with the original audio file. For example, an amateur musician can record an overdub track over the original audio file using audio interface 120. This overdub track can then be included in the component audio files and routed to the audio generators as part of the routing scheme. When the component audio files do not contain all features of the original audio file, such as specific instrument parts, audio player 110 can add those features to the component audio files. For example, when extracting component audio files from an original audio file, a narrow frequency range may be selected for each component audio file that does not capture very high or very low frequencies in the mix. These leftover "outlier" frequencies can be incorporated in the output as a new component audio file, as additions to the existing component audio files, or via other means.

The component audio files can be received from an online platform. This online platform can host component audio files associated with original audio files. The hosted files can be uploaded by record labels, recording artists, producers, or others for use with audio system 100. Hosted files can be downloaded for free or under a paid model, including paying per component audio file (bass track), per set of component audio files associated with an original audio file (a song's vocal, guitar, bass, and drum tracks), or per unit time (month, year, etc.). The online platform can host SilverVibes files or separate component audio files, metadata, or other data relevant for audio system 100.

The component audio files or the original audio file can be streamed from an online service. For example, audio player 110 can be a Bluetooth receiver receiving streaming data from an associated mobile phone, and can process the streaming audio files in real time. The audio files can be streamed recordings (for example, from Spotify) or live streams (for example, from Facebook Live concerts). While the examples above primarily discuss audio system 100 used in a musical context, there are numerous scenarios in which such an audio could be used. Other audio that could benefit from the treatment of audio system 100 may include movies, television, radio (talk show, sports broadcasting, etc.), audiobooks, and other audio media.

FIG. 2 illustrates an example system 200 for determining a routing scheme. Determining the routing scheme occurs in three steps: demixing the original audio file into component audio files; labeling the component audio files; and determining the routing scheme based on the labeled component audio files and data about the available audio generators. All elements of system 200 can be components of audio player 110, components of an external system, or a combination thereof Demixing algorithm trainer 210 can train a demixing algorithm on received training data. The training data can include original audio files associated with sets of component audio files associated with the original audio files. The original audio files used to predict the component audio files can also have associated features, such as audio profiles, performing artists, genres, instrumentation, year of release, year of recording, equipment recorded on (microphones, mixing boards, analog/digital), or other features. Demixing algorithm trainer 210 can send the trained demixing algorithm to demixer 220, which can apply the trained demixing algorithm to the original audio file. By applying the trained demixing algorithm to the original audio file, demixer 220 can generate component audio files, which can be sent to labeler 240.

The demixing algorithm can be a machine learning algorithm, trained using unsupervised learning techniques by demixing algorithm trainer 210, to extract component audio files from an original audio file. Demixing algorithm trainer 210 can train the algorithm on any or all of the features included in the training dataset.

For example, the demixing algorithm can use cluster analysis on the audio profile of the original audio file in order to determine clusters of frequencies that could be extracted as component audio files. To achieve this, the demixing algorithm can include one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the training dataset. Demixing algorithm trainer 210 can use other algorithms, such as Apriori algorithms, to assess confidence that generated clusters are meaningful.

In another example, the demixing algorithm can include recurrent neural networks (RNNs) or convolutional neural networks (CNNs). These neural networks can be trained, for example, to extract certain instrument component audio files from the original file, such as extracting a bass part, guitar part, or piano part. The training dataset can associate these instrument component audio files with the original audio file to provide means for the neural networks to train. Different neural networks can be used for different genres, instrumentation, or recording artists, or a neural network can incorporate these features to modify the component audio file extraction process.

In another example, the demixing algorithm can include support vector machines (SVMs), supervised, semi-supervised, ensemble, or unsupervised machine-learning techniques. These can be trained on audio profiles or any other features available in the training dataset.

Demixing algorithm trainer 210 can update one or more model coefficients of the demixing algorithm. Updating the model coefficients can be based on feedback regarding the component audio files generated by the demixing algorithm to either reinforce the algorithm or to revise the algorithm. Demixing algorithm trainer 210 can use various training techniques, such as such as cross-validation, to note discrepancies between generated component audio files and desired component audio files and update the demixing algorithm accordingly. Feedback can be received, for example, manually from user 170 as illustrated in FIG. 1.

Labeling algorithm trainer 230 can train a labeling algorithm on received training data. The training data can include component audio files associated with audio labels. The audio labels can be, for example, instrument type (guitar, bass, piano), role in a mix (melody, harmony), or other types of labels. The component audio files used to predict the audio labels can also have associated features, such as audio profiles, performing artists, genres, instrumentation, year of release, year of recording, equipment recorded on (microphones, mixing boards, analog/digital), or other features. Labeling algorithm trainer 230 can send the trained labeling algorithm to labeler 240, which can apply the trained labeling algorithm to the component audio files. By applying the trained labeling algorithm to the component audio files, labeler 240 can generate audio labels for the component audio files, which can be sent to router 260. The labeling algorithm can include any algorithm types used in the demixing algorithm, among others, and can be similarly trained by labeling algorithm trainer 230.

Routing algorithm trainer 250 can train a routing algorithm on received training data. The training data can include labeled component audio files associated with audio generators. The labeled component audio files to be associated with the audio generators can also have associated features, such as audio labels, audio profiles, performing artists, genres, instrumentation, year of release, year of recording, equipment recorded on (microphones, mixing boards, analog/digital), or other features. The audio generators can be, for example, instrument amplifiers 140, automated instruments 150, or speakers 160 as illustrated in FIG. 1, and can have associated features including frequency profiles, year of manufacture, visual appearance, volumetric dimensions, location in a spatial environment, or other features. Routing algorithm trainer 250 can send the trained routing algorithm to router 260, which can apply the trained routing algorithm to the audio labels and audio generators. By applying the trained routing algorithm to the audio labels, router 260 can generate a routing scheme for the component audio files and the audio generators, which can be included as an output from audio player 110 as illustrated in FIG. 1.

The routing algorithm can include any algorithm types used in the demixing or labeling algorithms, among others, and can be trained by routing algorithm trainer 250. The routing algorithm can further include algorithms designed to pair arrays of entities, in this case pairing component audio files with audio generators, such as matching algorithms used in graph theory. From the training dataset, the routing algorithm can learn how to create matchings of audio generators and component audio files based on various features of the component audio files and the audio generators. For example, the routing algorithm can generate all possible matchings of component audio files to audio generators and score these matchings based on various learned criteria, such as the correspondence of the audio profiles and frequency profiles, use of all available audio generators, etc., and choose the best possible matching from the set of all possible matchings.

A routing scheme can be optimized for achieving a certain type of sound, such as the sound of a live band, given a set of component audio files and a set of audio generators. The value of the routing scheme can be matching the audio profiles of the component audio files with the frequency profiles of the audio generators. By specifying distribution the component audio files to the appropriate audio generators, the routing scheme can vastly alter and improve sound quality of the original audio file relative to an audio system without a routing scheme. An in-depth discussion of the differences between the present technology and the prior art, and the advantages present herein, is presented with respect to FIG. 5.

A user 170 can input what type(s) of sound the routing scheme should optimize for, or it can be determined automatically by router 260. Examples of types of sound include live concert sound, live-in-the-studio sound, studio sound, arena sound, intimate venue sound, or other types of sound. Router 260 can learn categories of sound from audio profiles of original audio files and component audio files, and can tweak routing schemes to optimize for such types of sound. A user 170 can further input capabilities and features of the audio generators that are to be used to reproduce the original audio file. See below for a more in-depth discussion of recreating the original audio file.

Routing schemes optimizing for certain types of sound can be altered based on the available audio generators. For example, consider guitar, bass, drum, and vocal tracks associated with a studio recording by a rock band, and a routing scheme optimized for creating a live sound. If a guitar amplifier, bass amplifier, automated drumset, and vocal speaker are available, the tracks can be routed to these audio generators, respectively. If only a guitar amplifier and an all-purpose speaker are available, the routing scheme can route the guitar and bass tracks to the guitar amplifier and the drums and vocal tracks to the all-purpose speaker. Component audio files can be routed to audio generators to create certain effects. For example, an acoustic piano track can be routed through an electric guitar amplifier to create a certain sound. Similarly, orchestral tracks may utilize different sets of instruments, each of which may be associated with a corresponding component audio file that may be captured and routed to different audio generators to optimize for a certain audio experience.

Routing schemes can be altered dynamically and in real-time by audio player 110. For example, consider a situation where an audio generator loses power. Audio player 110 can update the routing scheme to dynamically reroute the component audio files that were played through that audio generator to other available audio generators. In another example, consider a pop song like Lou Reed's "Take A Walk on The Wild Side." At the end of the song, the vocals drop out and a saxophone enters. Audio player 110 can update the routing scheme to route the saxophone part to the audio generators previously receiving the vocal part, or reroute the component audio files in other ways. In some embodiments, the audio generators can be Internet of Things (IoT) devices that interact over a mesh network, and can dynamically reroute component audio files among themselves without input from audio player 110 or the creation of a new routing scheme. Dynamic re-routing can be based on changes in the audio profiles of component audio files, loss of power in certain audio generators, or other factors.

When component audio files are routed to new audio generators, the generated sound can have a different audio profile than the previously generated sound, which was generated through the previous audio generator. In such instances, user 170 or an automated system can EQ or re-mix component audio files such that the generated sound better matches the previously generated sound, or better matches the audio profile of the component audio file, or better matches another audio profile. The generated sound can be picked up using microphones, such as microphone 180 and fed back to a device, such as audio player 110 as illustrated in FIG. 1, or can be predicted using the audio profiles of the component audio file and the frequency profiles of the audio generators. Similar to the de-mixing algorithm, labeling algorithm, and routing algorithm, another algorithm trained to predicted generated audio profiles given the audio profiles of component audio files and frequency profiles of audio generators can be used, where the training dataset associates component audio file audio profiles and audio generator frequency profiles with generated audio profiles.

Similarly, routing a component audio file through an existing audio generator may not recreate the original sound generated when recording the original audio file. For example, suppose a component audio file is a DI recording of James Hetfield of Metallica playing the rhythm track for "Master of Puppets." In the studio, he used a Mesa Boogie Mark IIC+ slaved into a modded 100 W Marshall JCM800s to record this guitar part, but the only available guitar amplifier is a Peavey Studio Pro 112. A frequency profile of James Hetfield's hardware from this recording session can be used to EQ the DI recording or the frequency profile of the Peavey amplifier to better approximate the sound of his guitar being played through the Mesa Boogie/Marshall equipment. As mentioned above, an algorithm can learn to predict audio profiles of generated sounds using audio profiles of component audio files and frequency profiles of audio generators. This algorithm can then tweak either the audio profile of the component audio file (such as via EQing) or the frequency profile of the Peavey amplifier (such as by adjusting bass, treble, or high frequency amplification) to get close to the original sound from the recording.

Figure 3:
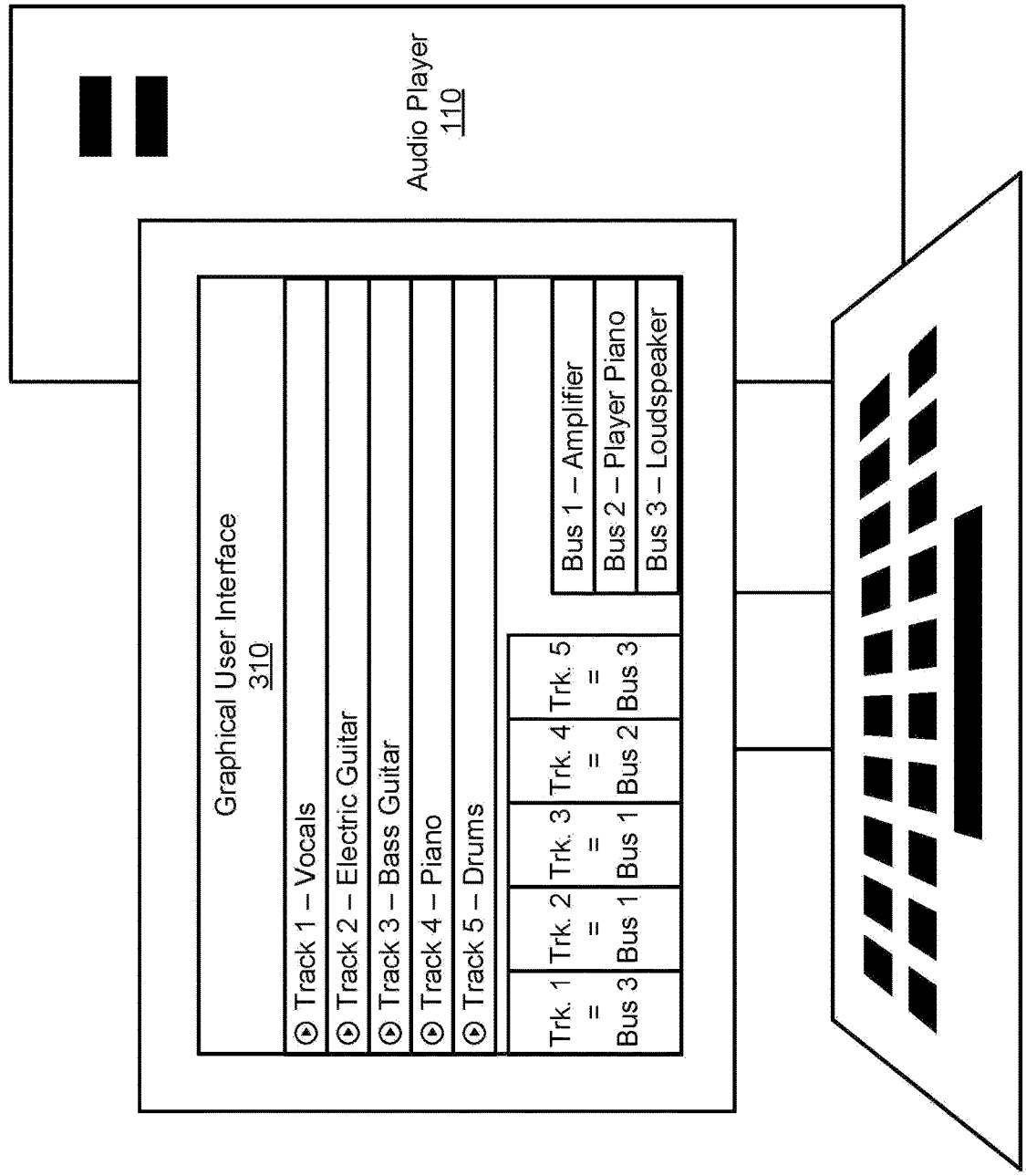
FIG. 3 illustrates an example graphical user interface (GUI) for managing audio files, in accordance with some embodiments.

While automated routing is described in detail with respect to FIG. 2, alternative or additional routing and mixing can be done by user 170 via a GUI 310 as illustrated in FIG. 3. FIG. 3 illustrates an example graphical user interface (GUI) system 300 for managing audio files via audio player 110. A user, such as user 170 as illustrated in FIG. 1, can use GUI 310 to manually generate or modify a routing scheme for a set of component audio files associated with an original audio file. In some implementations, a user may modify a routing scheme that had been automatically generated in order to further optimize for certain preferences or audio effects. Using GUI 310, therefore, the user may accept or reject parts of the recommended routing scheme that had been automatically generated. Such decisions or modifications by the user may be tracked and used by demixing algorithm trainer 210, labeling algorithm trainer 230, routing algorithm trainer 250, or by other algorithm trainers to refine future decisions made in relation to subsequent audio processing.

Audio player 110, which can be a computing device such as a personal computer, laptop, tablet, mobile phone, embedded Raspberry Pi, Bluetooth receiver, or other computing device, can be connected to a display, such as a computer monitor or mobile device display, which can display GUI 310. GUI 310 can be, for example, the GUI of a digital audio workstation (DAW), such as Pro Tools, Logic, Audacity, Ableton, Reaper, or others. The DAW can be a command line custom software or an automate algorithm, such as a machine-learning algorithm. GUI 310 can display component audio files, such as files for vocals, electric guitar, bass guitar, piano, and drums that are associated with the original audio file. The component audio files can be played synchronously or in isolation. Some DAWs offer capability to change the audio profiles of component audio files, such as by changing the volume in the mix or by changing the equalization (EQ) of the file, or by quantizing the timing of the file. EQing is the process of adjusting the balance of the audio profile of audio, and can involve strengthening or weakening the amplitude (volume) of specific frequencies. For example, EQing a bass guitar track can involve turning up the volume on low frequencies while reducing the volume of high frequencies to make the track even "bassier." Quantizing an audio file is the process of locking sounds to a rhythmic grid to make the sound more rhythmically precise. Other examples of means to alter the audio profile of a component audio file include harmonic effects, delay effects, modulation effects (chorus, tremolo, flanger, phaser), time-based effects (reverb, delay, echo), spectral effects (panning), dynamic effects (compression, distortion), humanization (the opposite of quantization), or shifting the file to sound before or after the beat.

Metadata associated with the component audio files can be used to alter them. For example, imagine the guitar solo in Led Zeppelin's "Stairway To Heaven," but user 170 wants to hear what it would sound like live as played by David Gilmour of Pink Floyd. Metadata associated with the guitar solo file can state "play in the style of David Gilmour," which can be interpreted by audio player 110 and the guitar solo file can be altered accordingly. Various musical aspects, such as guitar tone, picking intensity, vibrato, tremolo, pitch duration, timing, and even note selection can be altered. These alterations can be made by user 170 or via an automated process, such as a machine learning or artificial intelligence algorithm. For example, a neural network could take a sample of a David Gilmour guitar solo (such as "Comfortably Numb" from *Is There Anybody Out There? The Wall Live* 1980-81) and use data extracted from that sample, coupled with the guitar solo file, to generate the guitar solo file "as played by David Gilmour."

The audio profile of the component audio files can be done dynamically and in real time in response to input from user 170, in response to changes in the audio system (such as losing power to an audio generator), or in response to other factors.

Using GUI 310, user 170 can assign component audio files ("tracks") to busses. A bus is a signal path that can be used to combine individual audio signal paths together. In the present example, tracks 2 (electric guitar) and 3 (bass guitar) are assigned to bus 1. User 170 can group such tracks to a single bus based on where such tracks will be routed. User 170 can further assign audio generators, such instrument amplifiers 140, automated instruments 150, and speakers 160 as illustrated in FIG. 1, to the various busses. In the present example, bus 1 routes to instrument amplifiers 140, whose frequency profiles are designed for the frequency profiles of electric guitar and bass guitar.

GUI 310 can also display audio profiles of the tracks and the frequency profiles of the available audio generators. These can be displayed by mousing over the relevant GUI elements, in a separate display, or via other means. These audio profiles and frequency profiles can be used by user 170 to manually determine a routing scheme, or by a routing scheme interface within GUI 310 to automatically determine a routing scheme. A routing scheme interface can have various parameters available to user 170, which can alter the routing scheme, such as selecting certain audio generators, choosing a type of sound (live arena concert, intimate coffee shop venue, etc.), or other factors. These factors can be entered into GUI 310 and incorporated by router 260 as illustrated in FIG. 2 to determine a routing scheme based on the audio profiles of the component audio files and the frequency profiles of the audio generators.

FIG. 4 illustrates an example audio system 400. Container 410 can be a physical container holding various speakers, amplifiers, automated instruments, or other audio generators.

Container 410 can be a self-contained system of audio generators for use with an audio system, such as with audio player 110 and audio interface 120 as illustrated in FIG. 1. Various containers 410 can hold various combinations of audio generators, such as speakers 420, instrument amplifiers 430, and automated instruments 440. For example, one container 410 can be oriented towards rock music and primarily contain amplifiers and percussion; another container 410 can be oriented towards classical music and can primarily contain automated instruments. Containers 410 can contain different types of audio generators, which are better suited to venues of various sizes. For example, a small container 410 having few audio generators can be appropriate for a coffee shop, while a large container 410 with many audio generators (or larger audio generators) can be appropriate for a concert hall. Certain containers 410 can be used for karaoke to simulate the sound of a live band or ensemble.

Container 410 can be calibrated to a specific spatial environment. This can be achieved by manually altering the frequency profiles of the audio generators within container 410, or via automated means. For example, container 410 can play component audio files, its resonance within a spatial environment (such as a coffee shop, bar, or concert hall) can be recorded, and this recording can be used to automatically calibrate the EQ of various audio generators within container 410. In another example, container 410 can receive information about the spatial environment (dimensions, material of walls/floor, etc.) and feed that information into an algorithm, which automatically generates a calibration. The algorithm can be a trained machine learning algorithm or a hard-coded algorithm. Calibration of container 410 can be automated or can be done manually by user 170 as illustrated in FIG. 1.

An array of containers 410 can be used in tandem. For example, imagine playing a recording of a jazz big band through an array of containers 410, where each container 410 played a component audio file corresponding to one instrument in the mix. Different containers 410 could play saxophone, trumpet, trombone, clarinet, guitar, bass, piano, or percussion tracks associated with component audio files. The containers 410 could be arranged spatially similar to the layout of a big band to better approximate a live sound.

An array of containers 410 can be arranged spatially to add another element to audio playback. For example, containers 410 could be spaced throughout an audio installation where a part of the experience is walking around and hearing different mixes of the sound in different portions of the room. In another example, containers 410 could be utilized for spatial effects in off-stage orchestral cues, such as the offstage oboe in Hector Berlioz's *Symphonie Fantastique*.

FIG. 5 illustrates a comparison between example audio systems 500 and 550. Audio system 500 uses technology known in the art, while audio system 550 uses the present technology.

Audio player 110 in audio system 500 can send an original audio file to an audio interface 120, which can route the original audio file to audio generators 510, which can be left and right stereo speakers. Each audio generator 510 receives the original audio file, and each audio generator 510 generates an audio signal based on the original audio file input.

Audio player 110 in audio system 550 can send component audio files associated with an original audio file (and recommended routing scheme), to audio interface 120. Audio interface 120 can execute the routing scheme to send distinct sets of component audio files to each audio generator 510. The routing scheme can be based on the audio profiles of the component audio files and the frequency profiles of audio generators 510. Each audio generator 510 can receive a distinct set of component audio files, and each audio generator 510 can generate an audio signal based on the distinct set of component audio files it receives.

Various differences between audio system 500 and audio system 550 include:

Audio system 500 uses only an original audio file, whereas audio system 550 uses component audio files associated with the original audio file.

Audio system 550 includes a routing scheme that sends different audio files to different audio generators 510, while audio system 500 does not include a routing scheme and sends the same audio file (or different mixes of the same audio file in the case of stereo or surround sound) to each audio generator 510.

Audio system 500 can change the frequency response of the audio signal by mixing the original audio file (adjusting volume, adjusting EQ, applying effects such as reverb, etc.), whereas audio system 550 can change the frequency response of the audio signal by mixing each of the component audio files.

Audio system 550 can alter temporal profiles of the component audio files, whereas audio system 500 can alter the temporal profile of the original audio file.

Audio system 500 can play the entirety of the original audio file, whereas audio system 550 can play portions of the original audio file by playing only a subset of the component audio files and routing these to audio generators 510.

Audio system 550 can add elements not included in the original audio file into the mix, such as an overdubbed karaoke vocal track or instrumental track, and route these using the routing scheme to a specific audio generator 510, whereas audio system 500 can send an overdubbed track to all audio generators 510.

Audio system 550 can incorporate lost musical elements into the component audio files and the routing scheme when loss occurs in the process of extracting component audio files from the original audio file. This can be achieved, for example, by using Fourier transforms on audio files and analyzing the overtone series.

The differences between audio system 500 and audio system 550 listed above are not exhaustive, but are illustrative. Audio system 550 provides clear and distinct advantages over the prior art, as represented by audio system 500.

FIG. 6 illustrates a flowchart of an example method 600 for routing audio files through an audio system.

In some embodiments, the method 600 includes receiving input corresponding to a plurality of component audio files associated with an original audio file at step 610. For example, audio player 110 as illustrated in FIG. 1 can extract component audio files from an original audio file, receive component audio files from an online platform for sharing premixed audio tracks, or receive the input from other sources.

In some embodiments of step 610, receiving input corresponding to the plurality of component audio files includes receiving a demixing training dataset, the demixing training dataset associating audio files with pluralities of component audio files; training a demixing algorithm on the demixing training dataset, wherein the demixing algorithm is trained to associate audio files with pluralities of component audio files; applying the demixing algorithm to the original audio file; and generating, by the demixing algorithm, the plurality of component audio files. For example, demixing algorithm trainer 210 as illustrated in FIG. 2 can train a demixing algorithm to demix an original audio file into component audio files using various features of the original audio file, including its audio profile.

In some embodiments of step 610, the plurality of component audio files includes at least one of a WAV file, a MIDI file, or a file that can be processed by an automated instrument. For example, the component audio files routed to instrument amplifiers 140 can be WAV files, the component audio files routed to automated instruments 150 can be files that can be processed by automated instruments, and the component audio files routed to speakers 160 can be MIDI files as illustrated in FIG. 1.

In some embodiments of step 610, the plurality of component audio files are received from an online platform hosting pluralities of component audio files associated with original audio files, wherein the pluralities of component audio files are provided by a third party. For example, a recording studio can make their mixes widely available via an online platform, and the component audio files that comprise the mix can be downloaded by audio player 110 as illustrated in FIG. 1.

In some embodiments of step 610, the plurality of component audio files are packaged within a single file. For example, the plurality of component audio files can be packaged within a SilverVibes file, as described above.

In some embodiments, the method 600 includes determining audio profiles of the plurality of component audio files and frequency profiles of the plurality of audio generators at step 620. For example, audio player 110 as illustrated in FIG. 1 can determine audio profiles and frequency profiles and display them via GUI 310 as illustrated in FIG. 3.

In some embodiments of step 620, determining audio profiles of the plurality of component audio files and frequency profiles of the plurality of audio generators includes receiving a labeling training dataset, the labeling training dataset associating audio files with audio labels; training a labeling algorithm on the labeling training dataset, wherein the labeling algorithm is trained to associate audio files with audio labels; applying the labeling algorithm to the plurality of component audio files; and generating, by the labeling algorithm, audio labels for the plurality of component audio files. For example, labeling algorithm trainer 230 as illustrated in FIG. 2 can train a labeling algorithm to generate audio labels for component audio files using various features of the component audio files, including their audio profiles.

In some embodiments of step 620, the plurality of audio generators includes at least one of a loudspeaker, an instrument amplifier, or an automated instrument. For example, instrument amplifiers 140, automated instruments 150, and speakers 160 as illustrated in FIG. 1 are all examples of audio generators.

In some embodiments of step 620, the plurality of audio generators is calibrated to a spatial environment. For example, instrument amplifiers 140, automated instruments 150, and speakers 160 as illustrated in FIG. 1 can have their volume, EQ, or spacing altered to fit a specific environment, such as a rock arena or a coffee shop. The calibration can be done manually by a sound engineer or automatically.

In some embodiments of step 620, determining audio profiles of the plurality of component audio files and frequency profiles of the plurality of audio generators includes altering at least one of the audio profiles of the plurality of component audio files. For example, user 170 using GUI 310 as illustrated in FIG. 3 can add effects to a guitar track. Alterations of the audio profile can also be automated; for example, a machine learning algorithm can learn timing variations between live music and studio-recorded music and alter the audio profile to make it sound "more live."

In some embodiments, the method 600 includes determining a routing scheme for the plurality of component audio files and the plurality of audio generators, wherein the routing scheme is based on the audio profiles and frequency profiles at step 630. For example, audio player 110 as illustrated in FIG. 1 can determine a routing scheme for the component audio files and the available audio generators, in this case including instrument amplifiers 140, automated instruments 150, and speakers 160.

In some embodiments of step 630, determining the routing scheme includes receiving a routing training dataset, the routing training dataset associating audio files with audio generators; training a routing algorithm on the routing training dataset, wherein the routing algorithm is trained to associate audio files with audio generators; applying the routing algorithm to the plurality of component audio files and the plurality of audio generators; and generating, by the routing algorithm, the routing scheme for the plurality of component audio files and the plurality of audio generators. For example, routing algorithm generator 250 as illustrated in FIG. 2 can train a routing algorithm to generate a routing scheme for the component audio files and audio generators based on various features of the component audio files and of the audio generators, including their audio profiles and frequency profiles.

In some embodiments, the method 600 includes generating an output based on the routing scheme at step 640. For example, audio player 110 as illustrated in FIG. 1 can send component audio files and a routing scheme to audio interface 120.

In some embodiments of step 640, a virtual or augmented reality system is associated with the output, and the virtual or augmented reality system is capable of generating graphics of a recording artist associated with the original audio file. For example, a virtual or augmented reality system can be connected to audio player 110 as illustrated in FIG. 1 and can generate graphics viewable by user 170.

In some embodiments of step 640, the output is associated with a second plurality of audio generators, and the routing scheme can be modified based on the second plurality of audio generators. For example, audio player 110 as illustrated in FIG. 1 can be connected to new audio generators via audio interface 120 that are not instrument amplifiers 140, automated instruments 150, or speakers 160. The routing scheme can then be modified to account for these new audio generators.

In some embodiments of step 640, the original audio file contains at least one feature not contained in the plurality of component audio files, and the output includes the at least one feature. For example, demixer 220 as illustrated in FIG. 2 can demix an original audio file such that not every feature is allocated to a component audio file. When the output is generated, such as by audio player 110 as illustrated in FIG. 1, these missing features can be included in the output as new component audio files, as parts of the generated component audio files, or via other means.

In some embodiments of step 640, the output includes at least one feature not contained in the original audio file. For example, audio player 110 as illustrated in FIG. 1 can record, via audio interface 120, an overdub vocal or instrumental track not in the original audio file that can be included in the component audio files.

Figure 7:
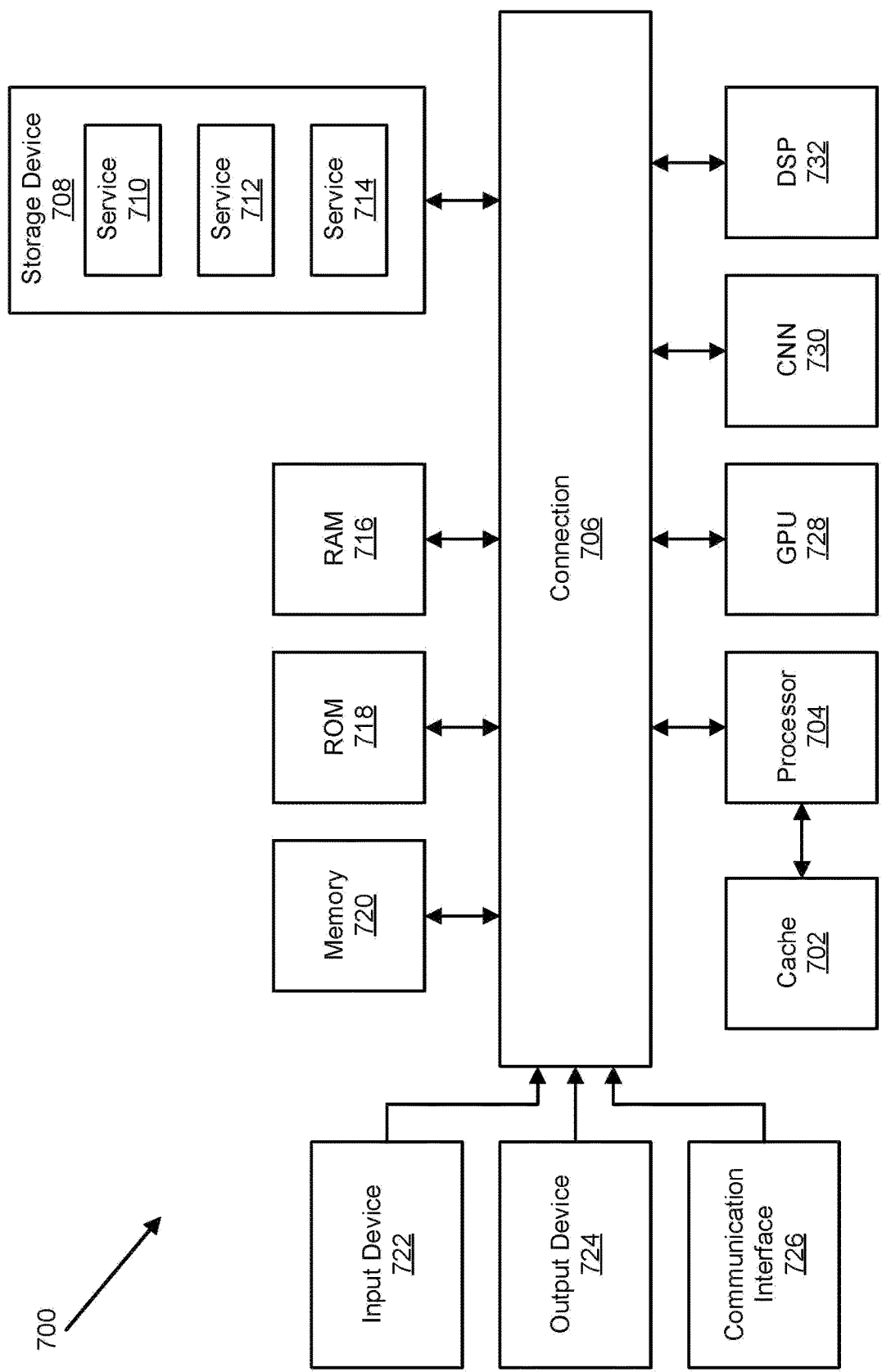
FIG. 7 illustrates an example computing system, which can be, for example, any computing device that can implement components of the present technology.

FIG. 7 illustrates a computing system architecture 700 including various components in electrical communication with each other using a connection 706, such as a bus, in accordance with some implementations. Example system architecture 700 includes a processing unit (CPU or processor) 704 and a system connection 706 that couples various system components including the system memory 720, such as ROM 718 and RAM 716, to the processor 704. The system architecture 700 can include a cache 702 of high-speed memory connected directly with, in close proximity to, or integrated as part of the processor 704. The system architecture 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions.

Other system memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system architecture 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system architecture 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media that can store data that are accessible by a computer, such as magnetic cassettes, flash memory cards, solid state memory devices, digital versatile disks, cartridges, RAMs 716, ROM 718, and hybrids thereof.

The storage device 708 can include services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

Specialized processors can be used for specific functions. GPU 728 can be a processor specialized for graphics. CNN 730 can be a processor specialized for convolutional neural networks. DSP 732 can be a processor specialized for digital signal processing.

The disclosed methods can be performed using a computing system. An example computing system can include a processor (e.g., a central processing unit), memory, nonvolatile memory, and an interface device. The memory may store data and/or and one or more code sets, soft-ware, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

The disclosed methods can be performed using a computing system. An example computing system can include a processor (e.g., a central processing unit), memory, nonvolatile memory, and an interface device. The memory may store data and/or and one or more code sets, soft-ware, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system. In some embodiments, the disclosed methods can be performed using virtualized environments.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may per-form at different times or at different locations one or more steps of one or more methods de-scribed or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RANI (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor. In some embodiments, the data may be encrypted.

Software can be stored in the non-volatile memory and/or the drive unit. Indeed, for large pro-grams, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor. In some embodiments, the software may be encrypted.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN modem, cable modem, token ring inter-face, satellite transmission interface (e.g., "direct PC"), or other interfaces for coupling a computer system to other computer systems. The interface can include one or more input and/or output (I/O) devices. The I/O devices can include, by way of example but not limitation, a key-board, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the nonvolatile memory and/or drive unit and can cause the processor to execute the various acts required by the operating sys-tem to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a de-sired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer sys-tem in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer pro-grams typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually affect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory de-vices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is in-tended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above De-tailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relation-ship or order between such entities or actions.

While processes or blocks are presented in a given order, alternative implementations may per-form routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims in-tended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlight-ed. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described here-in. Such an object may comprise information resulting from a computing process, where the in-formation is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject mat-ter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a dis-play screen, a speaker, a haptic feedback system, a printer, and/or other types of output devices. A data storage device, such as a hard drive or flash memory, can enable the computing device to temporarily or permanently store data. A network interface, such as a wireless or wired inter-face, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such con-figuration can be accomplished, for example, by designing electronic circuits or other hardware to perform the operation, by programming programmable electronic circuits (e.g., microprocessors, or other suitable electronic circuits) to perform the operation, or any combination thereof.

[The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RANI) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to per-form any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
receiving input corresponding to an original audio file and a plurality of audio generators;
training a labeling algorithm using a labeling training dataset, wherein the labeling algorithm is trained to associate audio files with audio labels;
determining audio profiles of a plurality of component audio files associated with the original audio file and frequency profiles of the plurality of audio generators, wherein determining the audio profiles includes applying the trained labeling algorithm to the plurality of component audio files associated with the original audio file to identify audio labels corresponding to the audio profiles for the plurality of component audio files;
determining a routing scheme for the plurality of component audio files and the plurality of audio generators, wherein the routing scheme matches a component audio file to an audio generator based on the audio profiles and the frequency profiles; and
generating an audio output based on the routing scheme, wherein the audio output is generated in accordance with the component audio file routed to the matching audio generator.

2. The method of claim 1, further comprising identifying the plurality of component audio files associated with the original audio file by:
training a demixing algorithm on a demixing training dataset that associates audio files with pluralities of component audio files, wherein the demixing algorithm is trained to associate audio files with associated pluralities of component audio files; and
applying the demixing algorithm to the original audio file to identify the associated plurality of component audio files.

3. The method of claim 1, wherein determining the routing scheme comprises:
training a routing algorithm on a routing training dataset that associates audio files with audio generators, wherein the routing algorithm is trained to associate audio files with audio generators; and
applying the routing algorithm to the plurality of component audio files and the plurality of audio generators to identify the routing scheme for the plurality of component audio files and the plurality of audio generators.

4. The method of claim 1, wherein the plurality of component audio files includes at least one of a WAV file, a MIDI file, or a file that can be processed by an automated instrument.

5. The method of claim 1, wherein the plurality of audio generators includes at least one of a loudspeaker, an instrument amplifier, or an automated instrument.

6. The method of claim 1, wherein the plurality of audio generators is calibrated to a spatial environment where the plurality of audio generators is located.

7. The method of claim 1, further comprising:
generating virtual or augmented reality graphics of a recording artist associated with the original audio file; and
presenting the generated virtual or augmented reality graphics via a virtual or augmented reality system in coordination with the audio output of the component audio files by the audio generators.

8. The method of claim 1, wherein the audio output is associated with a second plurality of audio generators, and wherein the routing scheme can be modified based on the second plurality of audio generators.

9. The method of claim 1, wherein the original audio file contains at least one audio feature not contained in the plurality of component audio files, and wherein the output includes the at least one audio feature.

10. The method of claim 1, wherein the audio output includes at least one audio feature not contained in the original audio file.

11. The method of claim 1, further comprising:
receiving the plurality of component audio files from a remote platform hosting pluralities of component audio files associated with original audio files, wherein the pluralities of component audio files are provided by a third party.

12. The method of claim 1, wherein the component audio files are packaged within a single file.

13. The method of claim 1, further comprising:
altering at least one of the audio profiles of the plurality of component audio files.

14. A system comprising:
a user interface that receives input corresponding to an original audio file and a plurality of audio generators;
at least one processor; and
a non-transitory computer-readable storage medium comprising instructions stored thereon, the instructions executable by the at least one processor to:
train a labeling algorithm using a labeling training dataset, wherein the labeling algorithm is trained to associate audio files with audio labels;
determine audio profiles of a plurality of component audio files associated with the original audio file and frequency profiles of the plurality of audio generators, wherein determining the audio profiles includes applying the trained labeling algorithm to the plurality of component audio files associated with the original audio file to identify audio labels corresponding to the audio profiles for the plurality of component audio files;
determine a routing scheme for the plurality of component audio files and the plurality of audio generators, wherein the routing scheme matches a component audio file to an audio generator based on the audio profiles and the frequency profiles; and
generate an audio output based on the routing scheme, wherein the audio output is generated in accordance with the component audio file routed to the matching audio generator.

15. The system of claim 14, wherein the at least one processor executes further instructions to identify the plurality of component audio files associated with the original audio file by:
training a demixing algorithm on a demixing training dataset that associates audio files with pluralities of component audio files, wherein the demixing algorithm is trained to associate audio files with associated pluralities of component audio files; and
applying the demixing algorithm to the original audio file to identify the associated plurality of component audio files.

16. The system of claim 14, wherein the at least one processor determines the routing scheme by:
training a routing algorithm on a routing training dataset that associates audio files with audio generators, wherein the routing algorithm is trained to associate audio files with audio generators; and applying the routing algorithm to the plurality of component audio files and the plurality of audio generators to identify the routing scheme for the plurality of component audio files and the plurality of audio generators.

17. The system of claim 14, wherein the plurality of component audio files includes at least one of a WAV file, a MIDI file, or a file which can be processed by an automated instrument.

18. The system of claim 14, wherein the plurality of audio generators includes at least one of a loudspeaker, an instrument amplifier, or an automated instrument.

19. The system of claim 14, wherein the plurality of audio generators is calibrated to a spatial environment where the plurality of audio generators is located.

20. The system of claim 14, wherein the at least one processor executes further instructions to:

generate virtual or augmented reality graphics of a recording artist associated with the original audio file; and present the generated virtual or augmented reality graphics via a virtual or augmented reality system in coordination with the audio output of the component audio files by the audio generators.

21. The system of claim 14, wherein the output is associated with a second plurality of audio generators, and wherein the routing scheme can be modified based on the second plurality of audio generators.

22. The system of claim 14, wherein the original audio file contains at least one audio feature not contained in the plurality of component audio files, and wherein the output includes the at least one audio feature.

23. The system of claim 14, wherein the audio output includes at least one audio feature not contained in the original audio file.

24. The system of claim 14, further comprising a communication interface that communicates over a communication network to receive the plurality of component audio files from a remote platform hosting pluralities of component audio files associated with original audio files, wherein the pluralities of component audio files are provided by a third party.

25. The system of claim 14, wherein the component audio files are packaged within a single file.

26. The system of claim 14, wherein the at least one processor executes further instructions to:

alter at least one of the audio profiles of the plurality of component audio files.

27. A non-transitory computer-readable storage medium comprising instructions stored thereon, the instructions executable by at least one processor to:

receive input corresponding to an original audio file and a plurality of audio generators;

train a labeling algorithm using a labeling training dataset, wherein the labeling algorithm is trained to associate audio files with audio labels;

determine audio profiles of a plurality of component audio files associated with the original audio file and frequency profiles of the plurality of audio generators, wherein determining the audio profiles includes applying the trained labeling algorithm to the plurality of component audio files associated with the original audio file to identify audio labels corresponding to the audio profiles for the plurality of component audio files;

determine a routing scheme for the plurality of component audio files and the plurality of audio generators, wherein the routing scheme matches a component audio file to an audio generator based on the audio profiles and the frequency profiles; and generate an audio output based on the routing scheme, wherein the audio output is generated in accordance with the component audio file routed to the matching audio generator.

28. The non-transitory computer-readable storage medium of claim 27, further comprising instructions executable to identify the plurality of component audio files associated with the original audio file by:

training a demixing algorithm on a demixing training dataset that associates audio files with pluralities of component audio files, wherein the demixing algorithm is trained to associate audio files with associated pluralities of component audio files; and applying the demixing algorithm to the original audio file to identify the associated plurality of component audio files.

29. The non-transitory computer-readable storage medium of claim 27, wherein determining the routing scheme comprises:

training a routing algorithm on a routing training dataset that associates audio files with audio generators, wherein the routing algorithm is trained to associate audio files with audio generators; and applying the routing algorithm to the plurality of component audio files and the plurality of audio generators to identify the routing scheme for the plurality of component audio files and the plurality of audio generators.

30. The non-transitory computer-readable storage medium of claim 27, wherein the plurality of component audio files includes at least one of a WAV file, a MIDI file, or a file that can be processed by an automated instrument.

31. The non-transitory computer-readable storage medium of claim 27, wherein the plurality of audio generators includes at least one of a loudspeaker, an instrument amplifier, or an automated instrument.

32. The non-transitory computer-readable storage medium of claim 27, wherein the plurality of audio generators is calibrated to a spatial environment where the plurality of audio generators is located.

33. The non-transitory computer-readable storage medium of claim 27, further comprising instructions executable to:

generate virtual or augmented reality graphics of a recording artist associated with the original audio file; and present the generated virtual or augmented reality graphics via a virtual or augmented reality system in coordination with the audio output of the component audio files by the audio generators.

34. The non-transitory computer-readable storage medium of claim 27, wherein the audio output is associated with a second plurality of audio generators, and wherein the routing scheme can be modified based on the second plurality of audio generators.

35. The non-transitory computer-readable storage medium of claim 27, wherein the original audio file contains at least one audio feature not contained in the plurality of component audio files, and wherein the output includes the at least one audio feature.

36. The non-transitory computer-readable storage medium of claim 27, wherein the audio output includes at least one audio feature not contained in the original audio file.

37. The non-transitory computer-readable storage medium of claim 27, further comprising instructions executable to:
receive the plurality of component audio files from a remote platform hosting pluralities of component audio files associated with original audio files, wherein the pluralities of component audio files are provided by a third party.

38. The non-transitory computer-readable storage medium of claim 27, wherein the component audio files are packaged within a single file.

39. The non-transitory computer-readable storage medium of claim 27, further comprising instructions executable to:
alter at least one of the audio profiles of the plurality of component audio files.

40. A method comprising:
receiving input corresponding to an original audio file and a plurality of audio generators;
determining audio profiles of a plurality of component audio files associated with the original audio file and frequency profiles of the plurality of audio generators;
training a routing algorithm using a routing training dataset, wherein the routing algorithm is trained to associate audio files with audio generators;
determining a routing scheme for the plurality of component audio files and the plurality of audio generators by applying the trained routing algorithm to the plurality of component audio files and the plurality of audio generators to identify the routing scheme for the plurality of component audio files and the plurality of audio generators, wherein the routing scheme matches a component audio file to an audio generator based on the audio profiles and the frequency profiles; and
generating an audio output based on the routing scheme, wherein the audio output is generated in accordance with the component audio file routed to the matching audio generator.

41. The method of claim 40, further comprising identifying the plurality of component audio files associated with the original audio file by:
training a demixing algorithm on a demixing training dataset that associates audio files with pluralities of component audio files, wherein the demixing algorithm is trained to associate audio files with associated pluralities of component audio files; and
applying the demixing algorithm to the original audio file to identify the associated plurality of component audio files.

42. The method of claim 40, wherein determining the audio profiles of the plurality of component audio files comprises:
training a labeling algorithm on a labeling training dataset that associates audio files with audio labels, wherein the labeling algorithm is trained to associate audio files with audio labels; and
applying the labeling algorithm to the plurality of component audio files associated with the original audio file to identify audio labels corresponding to the audio profiles for the plurality of component audio files.

43. The method of claim 40, wherein the plurality of component audio files includes at least one of a WAV file, a MIDI file, or a file that can be processed by an automated instrument.

44. The method of claim 40, wherein the plurality of audio generators includes at least one of a loudspeaker, an instrument amplifier, or an automated instrument.

45. The method of claim 40, wherein the plurality of audio generators is calibrated to a spatial environment where the plurality of audio generators is located.

46. The method of claim 40, further comprising:
generating virtual or augmented reality graphics of a recording artist associated with the original audio file; and
presenting the generated virtual or augmented reality graphics via a virtual or augmented reality system in coordination with the audio output of the component audio files by the audio generators.

47. The method of claim 40, wherein the audio output is associated with a second plurality of audio generators, and wherein the routing scheme can be modified based on the second plurality of audio generators.

48. The method of claim 40, wherein the original audio file contains at least one audio feature not contained in the plurality of component audio files, and wherein the output includes the at least one audio feature.

49. The method of claim 40, wherein the audio output includes at least one audio feature not contained in the original audio file.

50. The method of claim 40, further comprising:
receiving the plurality of component audio files from a remote platform hosting pluralities of component audio files associated with original audio files, wherein the pluralities of component audio files are provided by a third party.

51. The method of claim 40, wherein the component audio files are packaged within a single file.

52. The method of claim 40, further comprising:
altering at least one of the audio profiles of the plurality of component audio files.

53. A system comprising:
a user interface that receives input corresponding to an original audio file and a plurality of audio generators;
at least one processor; and
a non-transitory computer-readable storage medium comprising instructions stored thereon, the instructions executable by the at least one processor to:
determine audio profiles of a plurality of component audio files associated with the original audio file and frequency profiles of the plurality of audio generators;
train a routing algorithm using a routing training dataset, wherein the routing algorithm is trained to associate audio files with audio generators;
determine a routing scheme for the plurality of component audio files and the plurality of audio generators by applying the trained routing algorithm to the plurality of component audio files and the plurality of audio generators to identify the routing scheme for the plurality of component audio files and the plurality of audio generators, wherein the routing scheme matches a component audio file to an audio generator based on the audio profiles and the frequency profiles; and
generate an audio output based on the routing scheme, wherein the audio output is generated in accordance with the component audio file routed to the matching audio generator.

54. The system of claim 53, wherein the at least one processor executes further instructions to identify the plurality of component audio files associated with the original audio file by:
training a demixing algorithm on a demixing training dataset that associates audio files with pluralities of component audio files, wherein the demixing algorithm is trained to associate audio files with associated pluralities of component audio files; and applying the demixing algorithm to the original audio file to identify the associated plurality of component audio files.

55. The system of claim 53, wherein the at least one processor determines the audio profiles of the plurality of component audio files by:

training a labeling algorithm on a labeling training dataset that associates audio files with audio labels, wherein the labeling algorithm is trained to associate audio files with audio labels; and applying the labeling algorithm to the plurality of component audio files associated with the original audio file to identify audio labels corresponding to the audio profiles for the plurality of component audio files.

56. The system of claim 53, wherein the plurality of component audio files includes at least one of a WAV file, a MIDI file, or a file which can be processed by an automated instrument.

57. The system of claim 53, wherein the plurality of audio generators includes at least one of a loudspeaker, an instrument amplifier, or an automated instrument.

58. The system of claim 53, wherein the plurality of audio generators is calibrated to a spatial environment where the plurality of audio generators is located.

59. The system of claim 53, wherein the at least one processor executes further instructions to:

generate virtual or augmented reality graphics of a recording artist associated with the original audio file; and present the generated virtual or augmented reality graphics via a virtual or augmented reality system in coordination with the audio output of the component audio files by the audio generators.

60. The system of claim 53, wherein the output is associated with a second plurality of audio generators, and wherein the routing scheme can be modified based on the second plurality of audio generators.

61. The system of claim 53, wherein the original audio file contains at least one audio feature not contained in the plurality of component audio files, and wherein the output includes the at least one audio feature.

62. The system of claim 53, wherein the audio output includes at least one audio feature not contained in the original audio file.

63. The system of claim 53, further comprising a communication interface that communicates over a communication network to receive the plurality of component audio files from a remote platform hosting pluralities of component audio files associated with original audio files, wherein the pluralities of component audio files are provided by a third party.

64. The system of claim 53, wherein the component audio files are packaged within a single file.

65. The system of claim 53, wherein the at least one processor executes further instructions to:

alter at least one of the audio profiles of the plurality of component audio files.

66. A non-transitory computer-readable storage medium comprising instructions stored thereon, the instructions executable by at least one processor to:

receive input corresponding to an original audio file and a plurality of audio generators;

determine audio profiles of a plurality of component audio files associated with the original audio file and frequency profiles of the plurality of audio generators;

train a routing algorithm using a routing training dataset, wherein the routing algorithm is trained to associate audio files with audio generators;

determine a routing scheme for the plurality of component audio files and the plurality of audio generators by applying the trained routing algorithm to the plurality of component audio files and the plurality of audio generators to identify the routing scheme for the plurality of component audio files and the plurality of audio generators, wherein the routing scheme matches a component audio file to an audio generator based on the audio profiles and the frequency profiles; and generate an audio output based on the routing scheme, wherein the audio output is generated in accordance with the component audio file routed to the matching audio generator.

67. The non-transitory computer-readable storage medium of claim 66, further comprising instructions executable to identify the plurality of component audio files associated with the original audio file by:

training a demixing algorithm on a demixing training dataset that associates audio files with pluralities of component audio files, wherein the demixing algorithm is trained to associate audio files with associated pluralities of component audio files; and applying the demixing algorithm to the original audio file to identify the associated plurality of component audio files.

68. The non-transitory computer-readable storage medium of claim 66, wherein determining audio profiles of the plurality of component audio files comprises:

training a labeling algorithm on a labeling training dataset that associates audio files with audio labels, wherein the labeling algorithm is trained to associate audio files with audio labels; and applying the labeling algorithm to the plurality of component audio files associated with the original audio file to identify audio labels corresponding to the audio profiles for the plurality of component audio files.

69. The non-transitory computer-readable storage medium of claim 66, wherein the plurality of component audio files includes at least one of a WAV file, a MIDI file, or a file that can be processed by an automated instrument.

70. The non-transitory computer-readable storage medium of claim 66, wherein the plurality of audio generators includes at least one of a loudspeaker, an instrument amplifier, or an automated instrument.

71. The non-transitory computer-readable storage medium of claim 66, wherein the plurality of audio generators is calibrated to a spatial environment where the plurality of audio generators is located.

72. The non-transitory computer-readable storage medium of claim 66, further comprising instructions executable to:

generate virtual or augmented reality graphics of a recording artist associated with the original audio file; and present the generated virtual or augmented reality graphics via a virtual or augmented reality system in coordination with the audio output of the component audio files by the audio generators.

73. The non-transitory computer-readable storage medium of claim 66, wherein the audio output is associated with a second plurality of audio generators, and wherein the routing scheme can be modified based on the second plurality of audio generators.

74. The non-transitory computer-readable storage medium of claim 66, wherein the original audio file contains at least one audio feature not contained in the plurality of component audio files, and wherein the output includes the at least one audio feature.

75. The non-transitory computer-readable storage medium of claim 66, wherein the audio output includes at least one audio feature not contained in the original audio file.

76. The non-transitory computer-readable storage medium of claim 66, further comprising instructions executable to:
receive the plurality of component audio files from a remote platform hosting pluralities of component audio files associated with original audio files, wherein the pluralities of component audio files are provided by a third party.

77. The non-transitory computer-readable storage medium of claim 66, wherein the component audio files are packaged within a single file.

78. The non-transitory computer-readable storage medium of claim 66, further comprising instructions executable to:
alter at least one of the audio profiles of the plurality of component audio files.

79. A method comprising:
receiving input corresponding to an original audio file and a plurality of audio generators;
identifying a plurality of component audio files associated with the original audio file by:
training a demixing algorithm using a demixing training dataset, wherein the demixing algorithm is trained to associate audio files with associated pluralities of component audio files; and
applying the demixing algorithm to the original audio file to identify the associated plurality of component audio files;
determining audio profiles of the plurality of component audio files associated with the original audio file and frequency profiles of the plurality of audio generators;
determining a routing scheme for the plurality of component audio files and the plurality of audio generators, wherein the routing scheme matches a component audio file to an audio generator based on the audio profiles and the frequency profiles; and
generating an audio output based on the routing scheme, wherein the audio output is generated in accordance with the component audio file routed to the matching audio generator.

80. The method of claim 79, wherein determining the audio profiles of the plurality of component audio files comprises:
training a labeling algorithm on a labeling training dataset that associates audio files with audio labels, wherein the labeling algorithm is trained to associate audio files with audio labels; and
applying the labeling algorithm to the plurality of component audio files associated with the original audio file to identify audio labels corresponding to the audio profiles for the plurality of component audio files.

81. The method of claim 79, wherein determining the routing scheme comprises:
training a routing algorithm on a routing training dataset that associates audio files with audio generators, wherein the routing algorithm is trained to associate audio files with audio generators; and
applying the routing algorithm to the plurality of component audio files and the plurality of audio generators to identify the routing scheme for the plurality of component audio files and the plurality of audio generators.

82. The method of claim 79, wherein the plurality of component audio files includes at least one of a WAV file, a MIDI file, or a file that can be processed by an automated instrument.

83. The method of claim 79, wherein the plurality of audio generators includes at least one of a loudspeaker, an instrument amplifier, or an automated instrument.

84. The method of claim 79, wherein the plurality of audio generators is calibrated to a spatial environment where the plurality of audio generators is located.

85. The method of claim 79, further comprising:
generating virtual or augmented reality graphics of a recording artist associated with the original audio file; and
presenting the generated virtual or augmented reality graphics via a virtual or augmented reality system in coordination with the audio output of the component audio files by the audio generators.

86. The method of claim 79, wherein the audio output is associated with a second plurality of audio generators, and wherein the routing scheme can be modified based on the second plurality of audio generators.

87. The method of claim 79, wherein the original audio file contains at least one audio feature not contained in the plurality of component audio files, and wherein the output includes the at least one audio feature.

88. The method of claim 79, wherein the audio output includes at least one audio feature not contained in the original audio file.

89. The method of claim 79, further comprising:
receiving the plurality of component audio files from a remote platform hosting pluralities of component audio files associated with original audio files, wherein the pluralities of component audio files are provided by a third party.

90. The method of claim 79, wherein the component audio files are packaged within a single file.

91. The method of claim 79, further comprising:
altering at least one of the audio profiles of the plurality of component audio files.

92. A system comprising:
a user interface that receives input corresponding to an original audio file and a plurality of audio generators;
at least one processor; and
a non-transitory computer-readable storage medium comprising instructions stored thereon, the instructions executable by the at least one processor to:
identify a plurality of component audio files associated with the original audio file by:
training a demixing algorithm using a demixing training dataset, wherein the demixing algorithm is trained to associate audio files with associated pluralities of component audio files; and
applying the demixing algorithm to the original audio file to identify the associated plurality of component audio files;
determine audio profiles of the plurality of component audio files associated with the original audio file and frequency profiles of the plurality of audio generators;
determine a routing scheme for the plurality of component audio files and the plurality of audio generators, wherein the routing scheme matches a component audio file to an audio generator based on the audio profiles and the frequency profiles; and generate an audio output based on the routing scheme, wherein the audio output is generated in accordance with the component audio file routed to the matching audio generator.

93. The system of claim 92, wherein the at least one processor determines the audio profiles of the plurality of component audio files by:
training a labeling algorithm on a labeling training dataset that associates audio files with audio labels, wherein the labeling algorithm is trained to associate audio files with audio labels; and
applying the labeling algorithm to the plurality of component audio files associated with the original audio file to identify audio labels corresponding to the audio profiles for the plurality of component audio files.

94. The system of claim 92, wherein the at least one processor executes further instructions to identify the plurality of component audio files associated with the original audio file by:
training a routing algorithm on a routing training dataset that associates audio files with audio generators, wherein the routing algorithm is trained to associate audio files with audio generators; and
applying the routing algorithm to the plurality of component audio files and the plurality of audio generators to identify the routing scheme for the plurality of component audio files and the plurality of audio generators.

95. The system of claim 92, wherein the plurality of component audio files includes at least one of a WAV file, a MIDI file, or a file which can be processed by an automated instrument.

96. The system of claim 92, wherein the plurality of audio generators includes at least one of a loudspeaker, an instrument amplifier, or an automated instrument.

97. The system of claim 92, wherein the plurality of audio generators is calibrated to a spatial environment where the plurality of audio generators is located.

98. The system of claim 92, wherein the at least one processor executes further instructions to:
generate virtual or augmented reality graphics of a recording artist associated with the original audio file; and
present the generated virtual or augmented reality graphics via a virtual or augmented reality system in coordination with the audio output of the component audio files by the audio generators.

99. The system of claim 92, wherein the output is associated with a second plurality of audio generators, and wherein the routing scheme can be modified based on the second plurality of audio generators.

100. The system of claim 92, wherein the original audio file contains at least one audio feature not contained in the plurality of component audio files, and wherein the output includes the at least one audio feature.

101. The system of claim 92, wherein the audio output includes at least one audio feature not contained in the original audio file.

102. The system of claim 92, further comprising a communication interface that communicates over a communication network to receive the plurality of component audio files from a remote platform hosting pluralities of component audio files associated with original audio files, wherein the pluralities of component audio files are provided by a third party.

103. The system of claim 92, wherein the component audio files are packaged within a single file.

104. The system of claim 92, wherein the at least one processor executes further instructions to:
alter at least one of the audio profiles of the plurality of component audio files.

105. A non-transitory computer-readable storage medium comprising instructions stored thereon, the instructions executable by at least one processor to:
receive input corresponding to an original audio file and a plurality of audio generators;
identify a plurality of component audio files associated with the original audio file by:
training a demixing algorithm using a demixing training dataset, wherein the demixing algorithm is trained to associate audio files with associated pluralities of component audio files; and
applying the demixing algorithm to the original audio file to identify the associated plurality of component audio files;
determine audio profiles of the plurality of component audio files associated with the original audio file and frequency profiles of the plurality of audio generators;
determine a routing scheme for the plurality of component audio files and the plurality of audio generators, wherein the routing scheme matches a component audio file to an audio generator based on the audio profiles and the frequency profiles; and
generate an audio output based on the routing scheme, wherein the audio output is generated in accordance with the component audio file routed to the matching audio generator.

106. The non-transitory computer-readable storage medium of claim 105, wherein determining audio profiles of the plurality of component audio files comprises:
training a labeling algorithm on a labeling training dataset that associates audio files with audio labels, wherein the labeling algorithm is trained to associate audio files with audio labels; and
applying the labeling algorithm to the plurality of component audio files associated with the original audio file to identify audio labels corresponding to the audio profiles for the plurality of component audio files.

107. The non-transitory computer-readable storage medium of claim 105, wherein determining the routing scheme comprises:
training a routing algorithm on a routing training dataset that associates audio files with audio generators, wherein the routing algorithm is trained to associate audio files with audio generators; and
applying the routing algorithm to the plurality of component audio files and the plurality of audio generators to identify the routing scheme for the plurality of component audio files and the plurality of audio generators.

108. The non-transitory computer-readable storage medium of claim 105, wherein the plurality of component audio files includes at least one of a WAV file, a MIDI file, or a file that can be processed by an automated instrument.

109. The non-transitory computer-readable storage medium of claim 105, wherein the plurality of audio generators includes at least one of a loudspeaker, an instrument amplifier, or an automated instrument.

110. The non-transitory computer-readable storage medium of claim 105, wherein the plurality of audio generators is calibrated to a spatial environment where the plurality of audio generators is located.

111. The non-transitory computer-readable storage medium of claim 105, further comprising instructions executable to:
generate virtual or augmented reality graphics of a recording artist associated with the original audio file; and present the generated virtual or augmented reality graphics via a virtual or augmented reality system in coordination with the audio output of the component audio files by the audio generators.

112. The non-transitory computer-readable storage medium of claim 105, wherein the audio output is associated with a second plurality of audio generators, and wherein the routing scheme can be modified based on the second plurality of audio generators.

113. The non-transitory computer-readable storage medium of claim 105, wherein the original audio file contains at least one audio feature not contained in the plurality of component audio files, and wherein the output includes the at least one audio feature.

114. The non-transitory computer-readable storage medium of claim 105, wherein the audio output includes at least one audio feature not contained in the original audio file.

115. The non-transitory computer-readable storage medium of claim 105, further comprising instructions executable to:
receive the plurality of component audio files from a remote platform hosting pluralities of component audio files associated with original audio files, wherein the pluralities of component audio files are provided by a third party.

116. The non-transitory computer-readable storage medium of claim 105, wherein the component audio files are packaged within a single file.

117. The non-transitory computer-readable storage medium of claim 105, further comprising instructions executable to:
alter at least one of the audio profiles of the plurality of component audio files.

* * * * *